United States Patent Office 3,442,470
Patented May 6, 1969

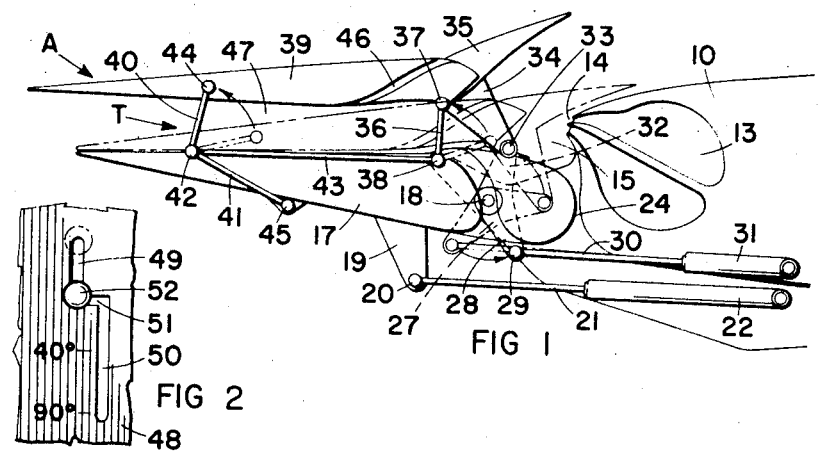
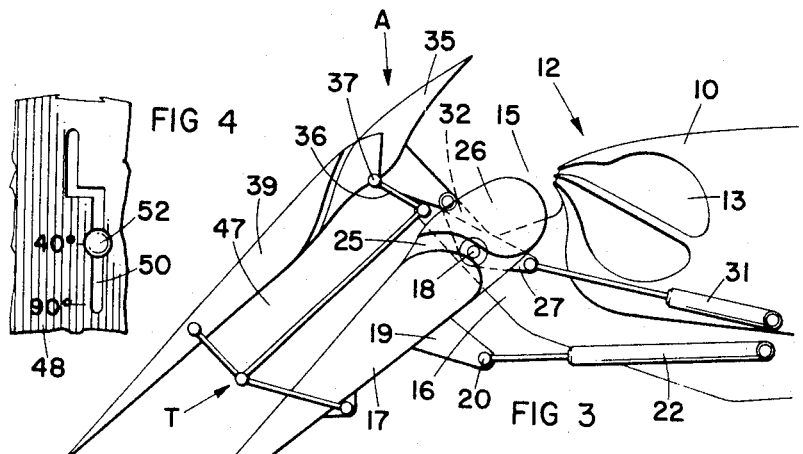
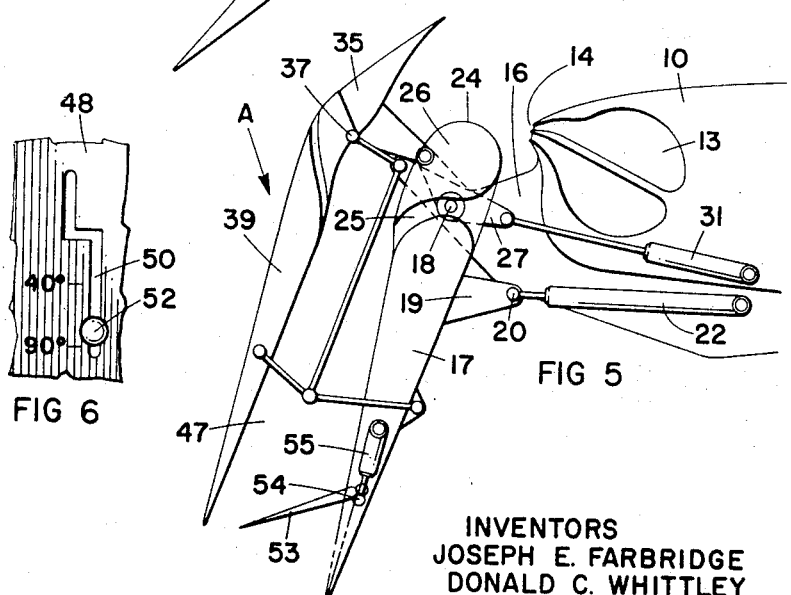
INVENTORS
JOSEPH E. FARBRIDGE
DONALD C. WHITTLEY
EDWARD H. SMITH
BY Cavanagh & Norman

3,442,470
AUGMENTOR WING STRUCTURE FOR AIRCRAFT
Joseph Edward Farbridge, Kettleby, Ontario, Donald Charles Whittley, Islington, Ontario, and Edward Howard Smith, Kleinburg, Ontario, Canada, assignors to The De Havilland Aircraft of Canada, Limited
Filed Apr. 3, 1967, Ser. No. 627,752
Int. Cl. B64c 3/38, 9/00
U.S. Cl. 244—42          6 Claims

ABSTRACT OF THE DISCLOSURE

This specification discloses augmentor wing flap mechanism comprising: an aircraft wing having a nozzle duct in its trailing edge; on or more supporting tabs extending rearwardly beyond the exhaust slot of the nozzle duct; a lower augmentor flap pivotally mounted on said tabs; a bell crank pivotally mounted on the tabs coaxially with the mounting of said flap; a hydraulic jack on the wing having a piston connected to an arm of the bell crank; a forward upper augmentor flap section having a depending bracket connected to the other arm of the bell crank; a link between said upper flap section and the tabs; a second link extending from said tab between said lower flap and an upper rear flap section, a toggle connecting said flaps; a second jack on the wing having a piston connected to the lower flap; and a spoiler flap located at an appropriate place on said mechanism.

---

This invention is related to augmentor wing aircraft and is concerned primarily with novel operating mechanism for the augmentor flaps.

An augmentor wing aircraft includes a pair of wings each having a trailing edge in which is mounted a nozzle duct having a rearwardly directed exhaust slot. Operatively mounted on the wing and extending rearwardly of the exhaust slot are lower and upper augmentor flaps with the upper flap comprising forward and rear sections.

An important object of the present invention is to provide new and improved mechanism for operating the augmentor flaps.

Another object is to provide, in mechanism of the type noted, one or more supporting tabs carried by the wing and extending rearwardly of the exhaust slot. Mounted on this tab and on a common axis are the lower augmentor flap and a bell crank which is in turn connected to the upper flap sections and a hydraulic jack.

Yet another object is to provide a toggle connecting the rear upper flap section to the lower flap with a link connecting the mid-part of the toggle to the tab aforesaid.

Another object in view is to provide, a mechanism of the character aforesaid, a second jack carried by the wing and having a piston connected to the lower flap, and through the toggle to the rear upper flap section.

Another highly important object of the invention is to provide in conjunction with augmentor flap mechanism of the kind described, control devices which provide for four basic positions of the augmentor flaps. These positions are: (1) Cruising in which the flaps are substantially closed; (2) A transition position in which the flaps are spaced and assume a direction which is substantially a continuation of the wing; (3) An angular position in which the flaps are directed downwardly and rearwardly; and (4) A final angular position in which the flaps more closely approach the vertical. The control devices include an operating member and a slot in which it is received to define the four positions aforesaid.

Still another object is to provide, in augmentor wing flap mechanism, a spoiler flap for increasing resistance to flow of air at a desired point. This spoiler may be pivotally mounted near the trailing edge of the lower flap, on the wing just forward of the exhaust slot, or other location found suitable. This function of the spoiler tab may be achieved by mounting the forward section of the upper flap so that it may be pivoted independently of the rear section. Also by dividing the lower flap into two sections with the forward section being pivoted independently of the rear section.

The invention therefore comprises mechanism for operating and controlling the position of augmentor flaps with the mechanism consisting of a lower augmentor flap pivotally mounted on a supporting tab; an upper flap including front and rear sections which are pivotally connected and pivotally mounted on the tab, a toggle connecting the lower flap to the rear upper flap section with the centre of the toggle being connected by a link to the pivotal mounting of the upper sections; a bell crank pivotally mounted coaxially with the lower flap and having one arm connected by a bracket to the front upper flap section, the other arm being connected to a jack on the wing, a second jack connected to the lower flap; a spoiler flap appropriately located; and control devices for positioning the flaps as desired.

Various other more detailed objects and advantages of the invention, such as arise in connection with carrying out the above noted ideas in a practical embodiment, will in part become apparent, and in part be hereinafter stated, as the description of the invention proceeds.

For a full and more complete understanding of the invention reference may be had to the following description and accompanying drawing, wherein:

FIGURE 1 is a side view, partly in elevation and partly schematic of an augmentor wing including the flap mechanism of this invention, illustrating two basic positions, one in full lines and one in broken lines;

FIGURE 2 is a schematic view of the operator for the control devices in one position;

FIGURE 3 is a view similar to FIGURE 1 illustrating the third of the basic positions;

FIGURE 4 is a view similar to FIGURE 2 depicting one position of the operator;

FIGURE 5 is a view similar to FIGURE 3 displaying the fourth position;

FIGURE 6 is still another schematic view for another flap position.

Referring now to the drawing, wherein like reference characters denote corresponding parts, and first more particularly to FIGURE 1, the wing of an aircraft is designated 10. It has a leading edge and a trailing edge 12. Mounted within the wing 10 adjacent to the trailing edge and extending therealong is a nozzle duct 13. The latter has an exhaust slot 14 opening onto the trailing edge. The nozzle duct 13 receives bypass air from a jet engine (not illustrated) by suitable cross ducts (also not illustrated). The bypass air is discharged under pressure through the exhaust slot 14 and creates a venturi effect which entrains air from the upper and lower surfaces of the wing 10 and delivers the combined air to the mouth 15 of the augmentor mechanism which is referred to in its entirety by the reference character A.

Extending rearwardly from the trailing edge 12 are a plurality of supporting tabs 16, only one of which is illustrated. It will be understood that while only one of the tabs 16 and associated operating mechanism is illustrated in the drawing and herein described as many as necessary to provide the desired support and operation are included in the mechanism.

A lower augmentor flap 17 is pivotally mounted at 18 on the tab. Depending from the flap 17 is a bracket 19 and pivotally connected thereto, as at 20, is the piston 21 of a hydraulic jack 22. The flap 17 has a forward rounded surface 24 and spaced inwardly therefrom is an air slot 25 which communicates between the upper and lower faces of the flap and marks off what might be called a front lower flap section 26.

A bell crank 27 is pivotally mounted centrally thereof on the tab 16 at pivot point 18. The lower arm 28 of bell crank 27 is pivotally connected at 29 to the piston 30 of another hydraulic jack 31 mounted on wing 10. The upper arm 32 of the bell crank 27 is pivotally connected at 33 to a bracket 34 that is rigidly secured to the underside of front upper augmentor flap section 35.

A link 36 has one end pivotally connected to the underside of flap section 35 as where the bracket 34 is joined thereto, this pivot point being shown at 37. The oher end of the link 36 is pivotally connected to the tip of the tab 16 as shown at 38.

A rear upper augmentor flap section 39 is pivotally connected to the front flap section 35 and link 36 at the pivot point 37. A toggle is identified in its entirety by the reference character T. It comprises toggle arms 40 and 41 which are pivotally connected at 42. A link 43 is connected at one end to the pivot 38 on tab 16 and at its other to the pivot 42 of the toggle T. Upper end of toggle arm 40 is pivotally connected at 44 to the rear flap section 39. The lower end of toggle arm 41 is pivotally connected at 45 to an end on the underside of the flap 17.

Between the sections 35 and 39 of the upper flap is an air passage 46 that opens onto the main air channel 47 betwen the upper and lower flaps the mouth 15 connecting with the channel 47 at its forward end and the passage 25 opens thereunto intermediate its ends.

While the actual control devices for the flap mechanism are not herein illustrated it will be understood they are connected to the hydraulic jacks 22 and 31 and include a plate 48 formed with two longitudinal slots 49 and 50 connected by a cross slot 51. An operating member 52 is movable in the slots 49, 50 and 51 and the position for this member in the slots determines the position of the flaps.

FIGURE 1 depicts in broken lines the positions of the augmentor flaps and FIGURE 2 the position of operating member 52 when the aircraft flies at cruising or higher speeds. In this position the main air channel 47 is substantially closed and little if any air flows therethrough.

The full lines of FIGURE 1 illustrate the condition when the operating member 52 has been shifted to the bottom of the slot 49 and which shifting has caused the jack 31 to draw the bell crank arm 28 forwardly just sufficiently to spread the lower flap 17 and upper flap 35–39 to open the channel 47. During this phase of the operation rotative motion of the bell crank 27 about pivot point 18 moves the bell crank arm rearwardly. This imparts an upward swinging movement to the flap section 35. As the later is connected at 37 to rear flap section 39 and one end of link 36 the latter swings on pivot 38 to move the entire upper flap away from the lower flap 17 and widen the channel 47. During this action the flap faces maintain a substantially parallel relation.

As depicted in FIGURES 2 and 4 the operating member 52 is moved across the slot 51 and partially down into slot 50. This action permits the operation of both jacks 22 and 31 to move the flaps into the position of FIGURE 3 in which the air channel 47 is directed downwardly and rearwardly at an angle of about 40° with respect to the horizontal.

In FIGURES 5 and 6 the operating member 52 has been moved to the bottom of slot 50. During this phase only the jacks 22 are operated. This swings the lower flap 17 in pivot 18 and due to the connection to upper flap section 39 by the toggle T the flap section 39 is also moved and its relation to front flap section 35 is altered.

A spoiler flap 53 is shown as pivotally mounted at 54 on the lower flap 17. It is optional as is its location. It may be operated by suitable devices such as a jack 55 and in its effective position extends itno the channel 47 to create a drag.

Rather than mount the spoiler flap as illustrated in FIGURE 5 it may be similarly mounted on the upper surface of the wing 10 just forward of the exhaust slot 14. When so positioned it performs the same function.

Similar drag effects may be attained by mounting the flap sections 26 and 35 so that they are independent of the remaining flap sections.

While a preferred specific embodiment of the invention is hereinbefore set forth it is to be clearly understood that the invention is not to be limited to the exact constructions, mechanisms and designs illustrated and described because various modifications of these details may be provided in puting the invention into practise.

What we claim is:

1. In an augmentor wing aircraft including a wing having a nozzle duct with an exhaust slot at its trailing edge and a supporting tab projecting rearwardly from the trailing edge; flap mechanism comprising: a lower augmentor flap pivotally mounted on said tab; a hydraulic jack on said wing and having a piston connected to said lower flap; a bell crank pivotally mounted coaxially with said flap on said tab and presenting lower and upper arms; a second hydraulic jack on said wing and having a piston connected to the lower bell crank arm; an upper augmentor flap having front and rear sections pivotally connected; said upper bell crank arm being connected to said front section; a toggle including a pair of arms pivotally connected; one end of one arm being connected to the rear upper flap section and one end of the other arm being connected to said lower flap; a link connecting the pivotal jointure of said upper flap sections to a pivot point on said tab; and another link having one end connected to said tab coaxially with said first link and its other end to the pivotal connection between said toggle arms.

2. The flap mechanism of claim 1 in which the front upper flap section has a bracket rigidly secured to the underside thereof with the end of the bracket being pivotally connected to the upper bell crank arm.

3. The flap mechanism of claim 1 in which there is a main air channel between said upper and lower flaps with the depth and direction of said channel being adjustable as an incident to operation of the flap mechanism.

4. The flap mechanism of claim 1 together with devices controlling the operation of said jacks; said control devices including a plate formed with a slot and an operating member movable in said slot to assume any of a plurality of basic positions therein.

5. The flap mechanism of claim 1 together with a spoiler flap pivotally mounted and movable into a position creating a drag on the air stream flowing through said mechanism.

6. The flap mechanism of claim 1 together with a spoiler flap pivotally mounted on the upperside of said lower flap; and a jack for moving said spider flap into effective position in said mechanism.

References Cited

UNITED STATES PATENTS

| 2,112,154 | 3/1938 | Hall | 244—42 |
| 2,284,519 | 5/1942 | Hall | 244—42 |
| 2,466,466 | 4/1949 | Morrisson | 244—42 |
| 2,635,837 | 4/1953 | Grant | 244—42 X |
| 3,153,522 | 10/1964 | Piper et al. | 244—42 |

FOREIGN PATENTS 856,539  6/1940  France.

MILTON BUCHLER, *Primary Examiner.*

R. A. DORNON, *Assistant Examiner.*